United States Patent [19]

Hodges, Sr. et al.

[11] Patent Number: 5,065,618
[45] Date of Patent: Nov. 19, 1991

[54] METHOD AND APPARATUS FOR DETERMINING TERRAIN SURFACE PROFILES

[75] Inventors: Hency C. Hodges, Sr.; Henry C. Hodges, Jr., both of Carson City; Sam C. Ashmore, Dayton, all of Nev.; Allan G. Piersol, Woodland Hills, Calif.

[73] Assignee: Hodges Transportation Inc., Carson City, Nev.

[21] Appl. No.: 613,232

[22] Filed: Nov. 14, 1990

[51] Int. Cl.$^5$ .............................................. E01C 23/00
[52] U.S. Cl. ...................................... 73/146; 73/105; 33/521
[58] Field of Search ...................... 73/146, 105, 178 R; 33/521, 141.5, 142, 338, 287

[56] References Cited

U.S. PATENT DOCUMENTS

| | | | |
|---|---|---|---|
| 4,422,322 | 12/1983 | Spangler | 73/105 |
| 4,473,319 | 9/1984 | Spangler | 73/146 |
| 4,741,207 | 5/1988 | Spangler | 73/146 |

Primary Examiner—Donald O. Woodiel
Attorney, Agent, or Firm—Owen, Wickersham & Erickson

[57] ABSTRACT

A method and apparatus for use in measuring the physical profile of a road surface and a methodology for frequency domain representation of the profile is disclosed. Force transducers and accelerometers are incorporated at each of the four wheels of a vehicle to measure the perturbations of the road surface in a direction normal to the surface over which the vehicle is driven. The disclosed implementation isolates the measurements from the motion of the vehicle body. A shaft encoder is incorporated at each of the front wheels to measure rotation of the wheels allowing the determination of distance traveled. A methodology for analysis of the data is also disclosed which provides vertical displacement data of the wheel/terrain interface while reducing the introduction of errors as the information is processed. Further methodology is used to analyze the data in the frequency domain and provide for the quantification of road/terrain characteristics useful for accelerated life testing of vehicles.

15 Claims, 4 Drawing Sheets

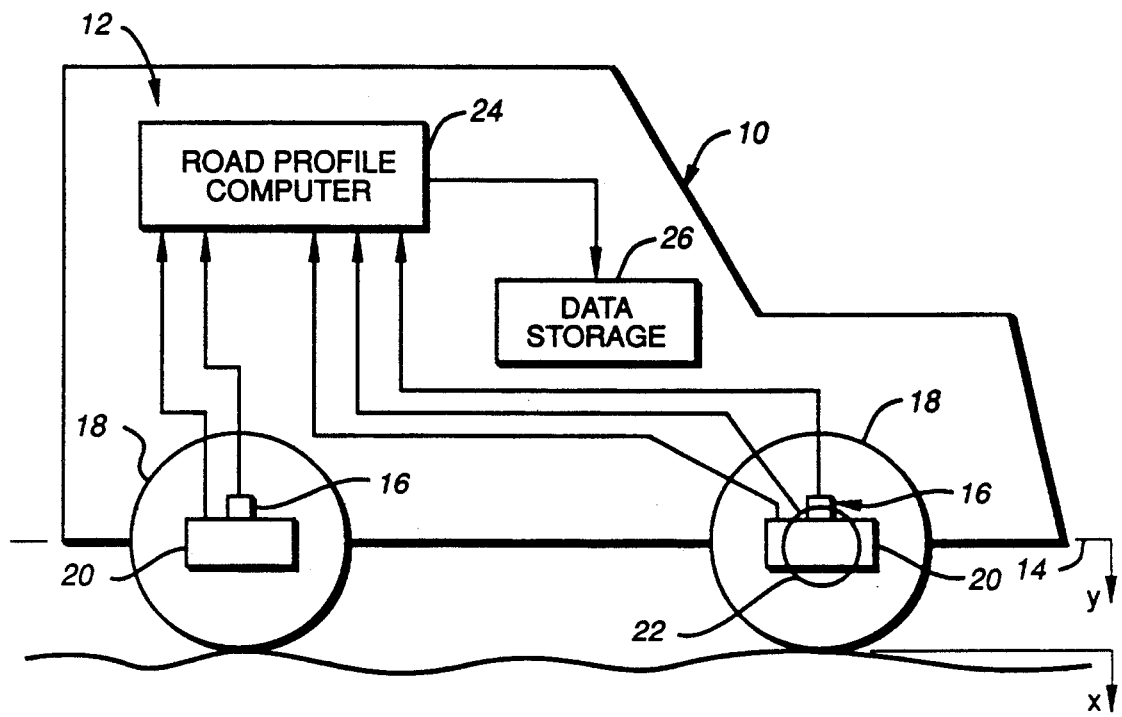
FIG._1
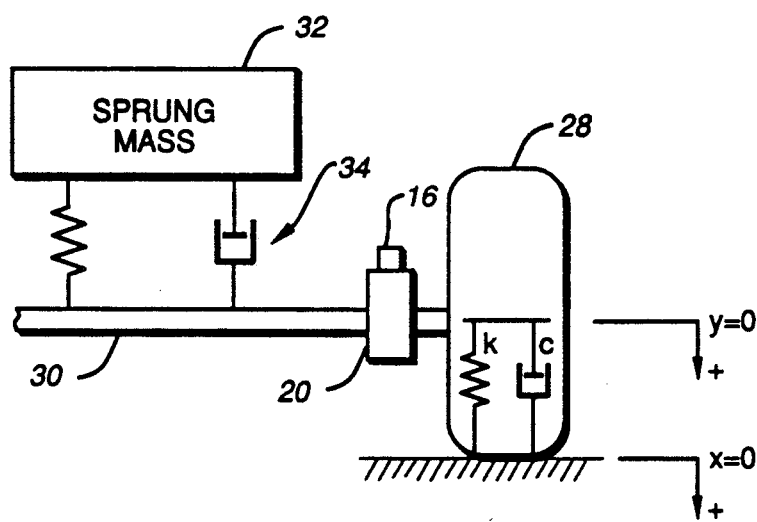
FIG._2

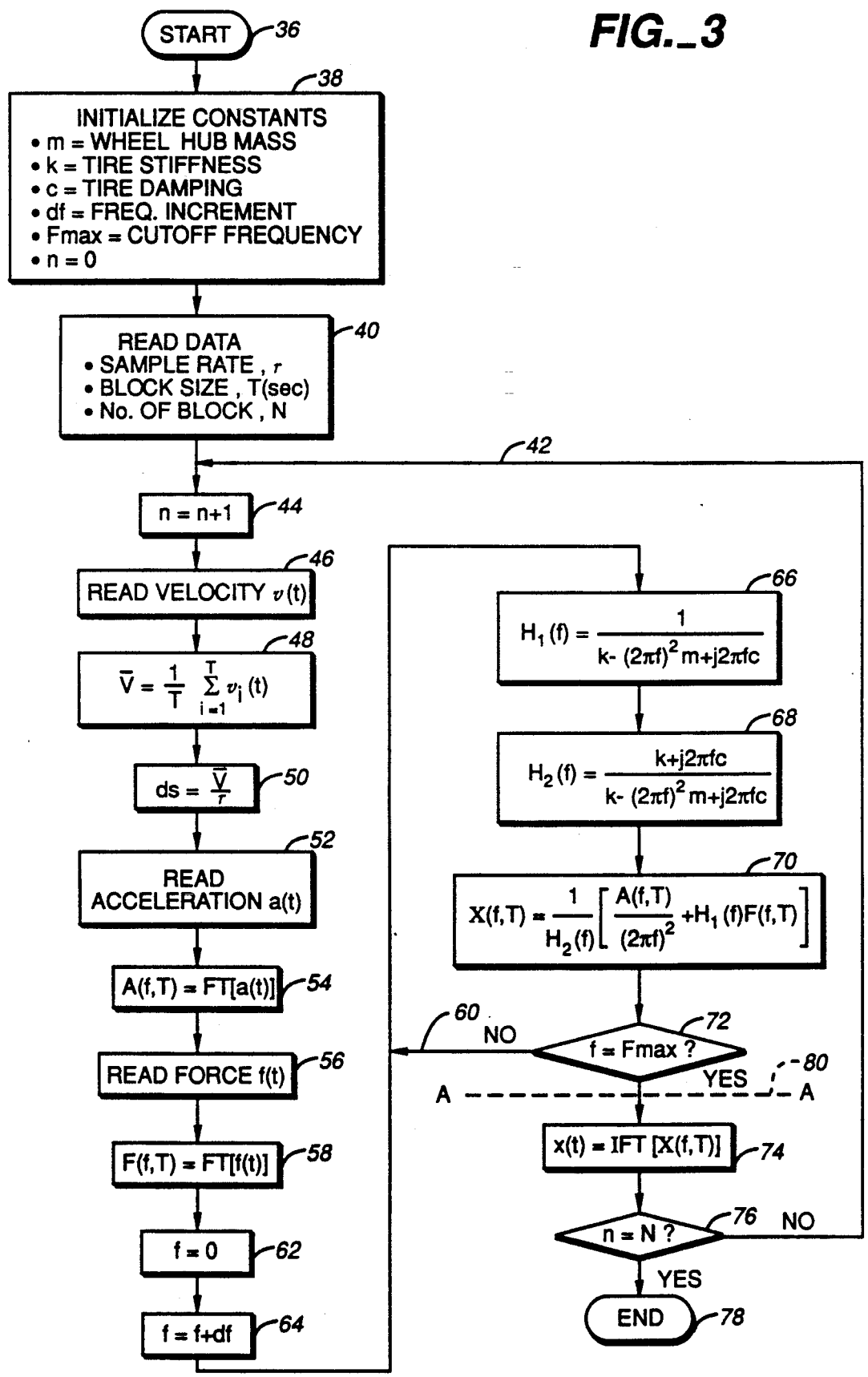
FIG._3

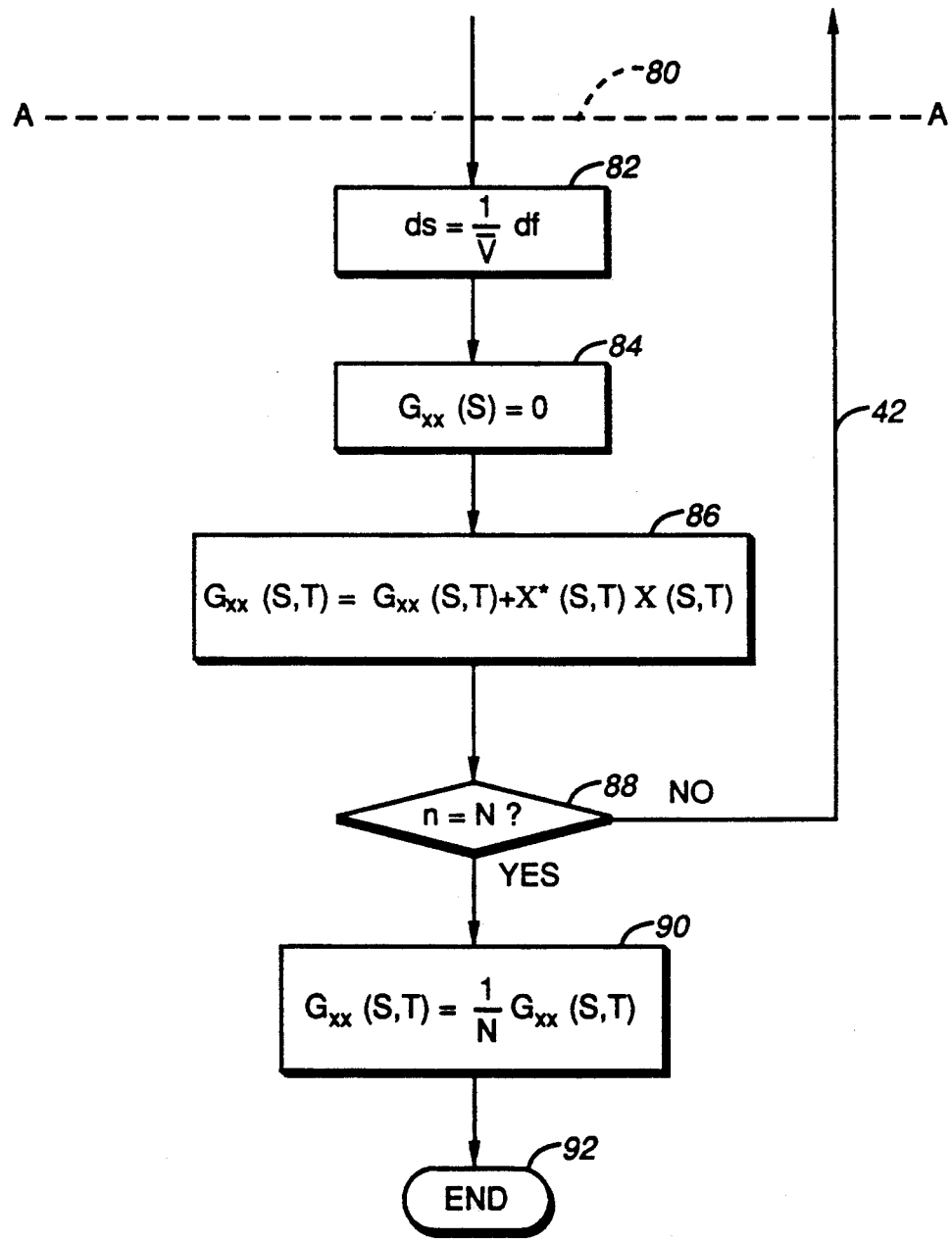
FIG._4

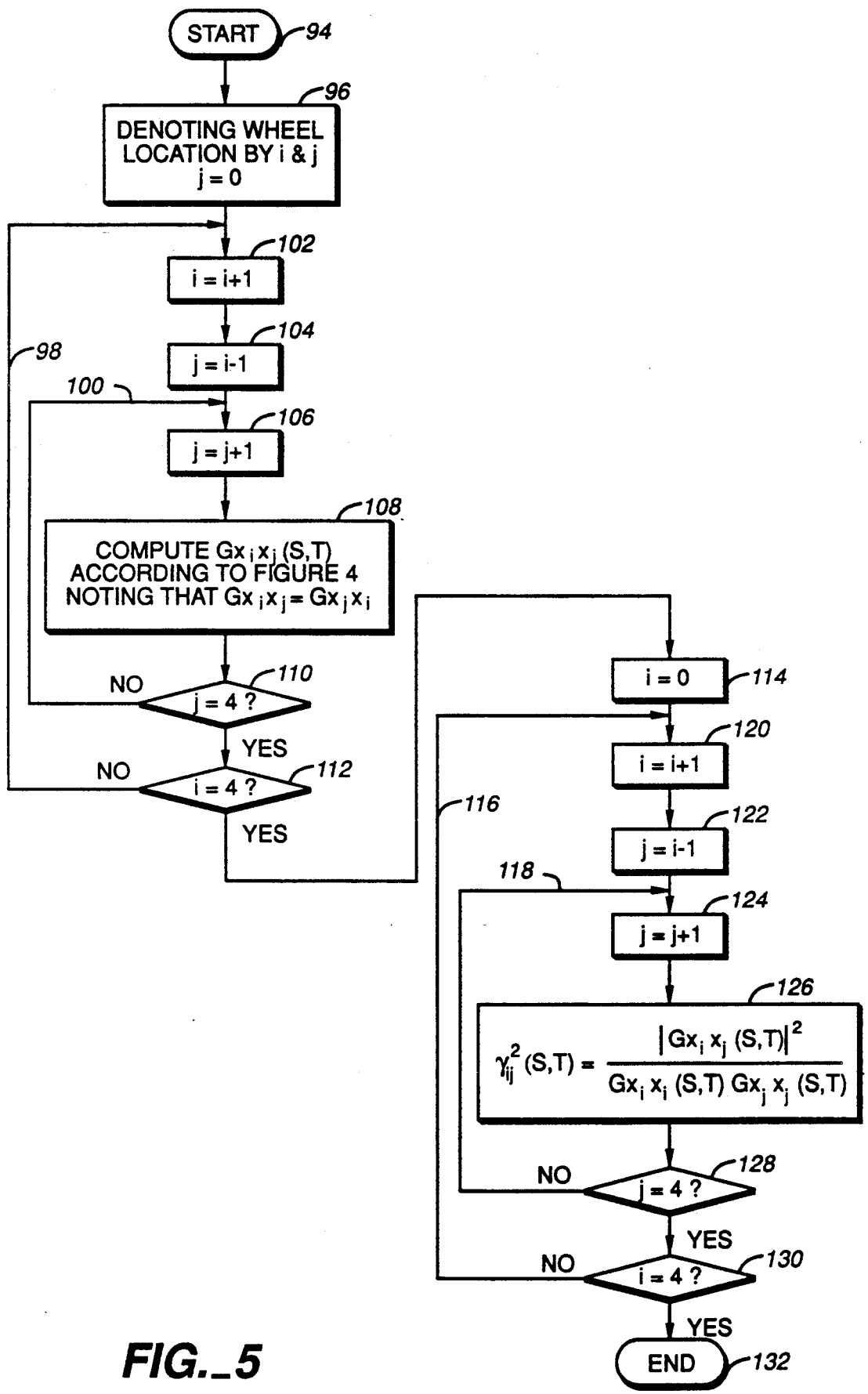
FIG._5

METHOD AND APPARATUS FOR DETERMINING TERRAIN SURFACE PROFILES

This invention relates generally to road profile measurement systems and, more particularly, to the use of acceleration measurements in combination with force measurements to isolate the wheel and tire dynamics from the vehicle chassis dynamics to improve the measurement of road profiles. Additionally, the invention relates to the methodology for analysis of the data in the frequency domain to reduce the introduction of errors inherent in manipulations in the time domain. Further, the invention relates to the methodology for analysis of the data in the frequency domain rendering the information useful for quantitative determination of terrain surface profiles and the degree of amplification of the surface roughness applicable to accelerated testing of vehicles.

BACKGROUND OF THE INVENTION

Vehicle traffic deteriorates a road over time, especially secondary and off-highway trails. On public paved and well-maintained road networks, this deterioration happens very slowly and may be noticeable only after several years. Changes in road roughness are indicators of maintenance requirements. In comparison, durability test courses used for wheeled and tracked vehicle evaluations can change much more rapidly and, depending on the weather and volume of traffic, can have significant changes daily. As the road changes, so does the input to the vehicle. Changes in road roughness may tend to over-test or under-test the vehicle. It is, therefore, necessary that repeatable methods of measuring the profile of the road being used in the test be developed. Further, it is desirable in the testing of vehicles to accelerate the effects of the testing in a controlled manner such that the time required for accomplishing a specified test length can be shortened.

A number of different road profile measurement systems have been in use worldwide. These systems can be classified into two groups: (1) systems that measure the profile directly, such as the surface dynamics profilometer or the rod and level method, and (2) systems which measure vehicle cumulative response to road roughness. The present invention fits into the first category; however, it is unique to that category. Whereas the majority of prior profilometers used pure motion measurements to calculate the terrain, the present invention uses force and motion measurements made at each axle-to-hub interface to calculate the terrain roughness.

The most straightforward method for measuring road profiles is with a surveyor's rod and level. The accuracy with which the profile can be determined is limited only by the resolution of the level instrument and the care taken by the operator and by the interval along the road at which measurements are taken. This method provides the accuracy required but is very tedious and time consuming. The present invention resolves this problem by providing accurate data at a high rate thereby enabling the practical use of road profiling.

An improvement on the rod and level technique was provided by the TRRL Beam, a device developed by the Overseas Unit of the Transport and Road Research Laboratory (TRRL) in England. This unit consisted of a box beam about 10 feet in length which was moved down the road such that a new starting position matched the old end position. The beam was supported by tripods at each end, along which a carriage rolled. The carriage included a vertical member with a pneumatic tire on the lower end which contacted the road and as the carriage was rolled along the beam, the distance from the beam to the road was continuously recorded. This method increased the speed at which measurements could be taken and reduced human error. However, it was still time consuming and prone to accumulation of error each time the apparatus was moved.

Another static method of the prior art for acquiring road profile information was a device supported on two legs spaced one foot apart and having a handle extending upward. The device automatically recorded the inclination angle between the two legs thereby giving a measure of the vertical displacement of the road surface as the device was "walked" along the surface of the road, pivoting first on one leg and then on the other. Again, this device suffered from having to make many independent measurements which lead to an accumulation of error and the method was also time consuming.

The present invention resolves the problems of these static methods by providing accurate data at a high rate while eliminating the accumulation of error.

High-speed profiling systems were developed about 1965 to increase the rate of acquiring road profile information. Most of the systems in use prior to the present invention were based on work done by General Motors Research Laboratory which was described in U.S. Pat. No. 3,266,302 to Spangler and Kelly. Further developments of that basic work by Spangler resulted in U.S. Pat. Nos. 4,422,322, and 4,741,207. These systems were comprised of a vehicle which was instrumented with a vertical accelerometer and a height sensor. The accelerometer measured the vertical motion of the vehicle body and the height sensor measured the distance from the vehicle body to the roadway. Used together, these measurements allowed the road profile to be computed. By compensating for vehicle motions, the resulting profile was related to an inertial reference system.

A variety of height sensors used in the implementation of these systems included mechanical follower wheels, optical sensors and ultrasonic sensors. Each of these prior methods exhibited limitations in profiling rough pavement or off-road terrain. The mechanical follower was limited by its dynamics in that it was required to remain in contact with the road surface at all times. Otherwise, the produced profile represented its path through the air rather than the surface of the road. This resulted in a limit on the speed of the measuring vehicle. Additionally, the mechanical follower was limited to relatively smooth surfaces.

Optical height sensors provided some improvement over the mechanical follower in that the dynamic interaction of the sensor with the road surface was eliminated. The implementation of the optical system usually incorporated a laser light source to beam a bright spot vertically downward on the road surface. A photodetector mounted to the side detected the spot at an angular position relative to the vehicle and variations in that angular relationship were converted to height variations. Since a monochromatic light source was used, filters were used in the photodetector to reduce its sensitivity to extraneous sources of light. One of the significant problems which arose with the optical sensor was a loss of signal when the spot illuminated a hole in the road surface and the photodetector could no longer "see" the spot. This represented a serious limitation to the roughness of the road which could be measured, thereby limiting the technique to relatively smooth, paved road surfaces.

Ultrasound systems can measure height by measuring the time required for a sound pulse to travel to the road surface, be reflected and travel back to the detector. However, a number of problems are presented with this method. The effects of wind and changes in air pressure must be compensated for as they effect the speed of the sound pulse or the path length which the pulse follows. In addition, the condition of the surface of the road effects the ability of the ultrasound detector to receive an adequate signal. If the road surface is too uneven, the sound pulse is scattered and an adequate reflection is not detected. This limits the use of ultrasound height detectors to smooth, paved surfaces. These systems are also sensitive to moisture requiring that the road surface be dry.

All of the aforesaid prior art systems have a common difficulty in measuring the profile of a road surface which is not smoothly paved. The present invention overcomes that limitation by eliminating the direct measurement of height altogether. The effects of roadway perturbations on the wheels supporting the vehicle are measured and the effective roadway profile is deduced from known characteristics of the wheel and tire. A further attribute of the present method is that the tires of the vehicle provide a "real world" filter for the roadway height variations which eliminates the need for analytical filtering of the resulting measurements, thereby eliminating a source for the introduction of error. Consequently, road surface texture does not contaminate the measurements.

The processing of the measurement data in the prior art methods was based on a digital manipulation in the spatial domain. Although this method provided for vehicle speed independence of the method, the possibility of the introduction of error due to the numerical integration remained. The present invention eliminates that source of error by performing the manipulation of the data in the frequency domain using Fourier Transformations. Further, the present methodology provides for the determination of the spectrum of the roadway perturbations in the frequency domain. This allows for the quantification of amplified perturbation inputs while maintaining the same relative amplitude of input at all frequencies. This methodology allows the testing of vehicles to be accelerated in the sense that the rate of energy input to a vehicle from the roadway is increased by a quantifiable amount while maintaining the relationships of the input at all frequencies.

A high-speed road profiling system was reported by Whittemore in SAE Paper 720094, dated January 1972 in which an attempt was made to determine road profile through the measurement of vertical acceleration and vertical force at the wheel. This prior art used a strain gaged spindle to acquire force data and an analog computer to perform the data analysis. This arrangement failed to accomplish the measurement of forces and data analysis with sufficient accuracy and, as a result of these limitations, practitioners in the field proceeded along the direction of the prior art discussed above. The present invention resolves the problems encountered by Whittemore in that a force transducer of a different construction and sensitivity is incorporated and a digital computation technique is employed to provide the accuracy required.

SUMMARY OF THE INVENTION

A general object of the present invention is to provide an improved and reliable system for measurement of terrain surface profile, with particular adaptation to off-road surface profile, and moreover a system which remedies some or all of the aforementioned deficiencies and shortcoming of the prior art.

Another object of the invention is to provide a method and system of the described type which provides a road profile output which is determined from information that is independent of the motion of the sprung mass of the measurement vehicle.

Another and more specific object of the invention is to provide a road profile measurement system which does not rely on the independent measurement of the surface of the roadway but only on the interaction of the vehicle's supporting tires with the road surface, thereby allowing the system to obtain a measurement of any surface over which the measurement vehicle can be driven. This allows the determination of the profile of off-road terrain.

A further object of the invention is to provide a method and apparatus for the measurement of road surface profile in which the introduction of computational error is minimized by performing the data manipulation in the frequency domain rather than in the time domain.

Still another object of the present invention is to provide a method and apparatus for the determination of the road profile in a manner which allows the quantification of amplified profile input to effectively allow acceleration of vehicle testing.

The foregoing and other objects are accomplished in accordance with the invention by providing a system and method which measures force and acceleration at the wheel hub and manipulates the road profile information in the frequency domain rather than in the time domain. Specifically, a force transducer and an accelerometer at the wheel hub measuring the vertical force applied to the wheel and the vertical acceleration experienced by the wheel hub is implemented at each of the four wheels.

To minimize the error in numerically integrating time dependent variables, the Fourier transform of the differential equation of motion is taken over a long but finite time duration, T. As described below, a mathematical treatment of the Fourier transform results in a frequency-domain representation of x which is used to define the road or terrain profile.

The invention also provides for the mathematical development of a Power Spectral Density (PSD) function which entails the use of road roughness data from a section of road in a statistical sense for quantifying accelerated durability testing.

Using the apparatus and method steps described herein, the present invention enables a development of a highly accurate road profile record which can be utilized in the testing of vehicles to study ride, vibration, structural integrity and durability.

Other objects, advantages and features of the invention will become apparent from the following detailed description which is presented in conjunction with the accompanying drawings.

BRIEF DESCRIPTION OF THE DRAWINGS

FIG. 1 is a schematic diagram of a vehicle equipped with a road profile measurement system in accordance with the invention;

FIG. 2 is a schematic diagram of the force and acceleration measurement system installed at each wheel of the vehicle to measure the road profile;

FIG. 3 is a flow chart of the digital embodiment of the Frequency Domain Analysis function of the road profile computer of FIG. 1 comprising a programmed digital computer;

FIG. 4 is a flow chart of a digital embodiment of the Power Spectral Density function of the road profile computer of FIG. 1 comprising a digital computer;

FIG. 5 is a flow chart of the digital embodiment of the Coherence function of the road profile computer of FIG. 1 comprising a programmed digital computer.

DETAILED DESCRIPTION OF PREFERRED EMBODIMENTS

With reference to the drawing, FIG. 1 illustrates a vehicle 10 equipped with a road profile measurement apparatus 12 in accordance with the invention for measuring road profile X as a distance from an imaginary plane 14 defined by the inertia element of an accelerometer 16 mounted at the interface of a measuring wheel 18 and the axle of the vehicle. A force transducer 20 also mounted at the interface of the wheel and the axle of the vehicle measures all forces imparted to the wheel 18 by the body of the vehicle. Apparatus 12 includes a distance measuring device 22 at the wheel 18 to provide a means for measuring the distance that the vehicle has moved along the road. The distance measuring device 22 may be suitably mounted to one or more of the vehicle wheels as shown, or to a separate "fifth wheel" attached to the vehicle.

The accelerometer 16, force transducer 20 and distance measuring transducer 22 direct their respective outputs to a road profile computer indicated generally at 24. In accordance with the present invention, the road profile computer 24 manipulates the terrain profile information exclusively in the frequency domain. The resulting computations of road profile, whether in the physical time history domain or in the statistical power spectral density format are recorded on a data storage device 26. The data storage device may comprise a magnetic tape recorder, an electronic memory device, etc. In another embodiment, the signals from the accelerometer 16, the force transducer 20 and the distance measuring transducer 22 may be recorded on the data storage device 26, after suitable electronic conditioning, for later analysis on a road profile computer which may be situated in a suitable laboratory and programmed in accordance with the principles of the present invention. FIGS. 3-5, to be discussed in detail hereinafter, illustrate various preferred embodiments of computer 24 in accordance with the present invention.

FIG. 2 is a schematic diagram of the wheel, hub and tire assembly 28 of a typical installation on a vehicle depicting the preferred embodiment of the accelerometer 16 and the force transducer 20 at the interface of the wheel hub and the vehicle axle 30. The relationship of said accelerometer and force transducer to the sprung mass 32 of the vehicle is represented and illustrates that the measurements by the accelerometer and force transducer are independent of the motion of the sprung mass 32 of the vehicle and of the characteristics of the suspension 34 of said vehicle.

In the discussion below involving mathematical equations the definition of variables is as follows:

NOMENCLATURE

Variables a Acceleration.
A (f,T) Fourier transform of a(t) over record length T.
c Tire damping.
f Frequency.
$f_c$ Cut-off frequency.
F* Force at the wheel/hub interface.
F (f,T) Fourier transform of F(t) over record length T.
$G_{xx}(f)$ Power spectral density function.
$H_1(f)$ Frequency response function.
$H_2(f)$ Frequency response function.
k Tire stiffness.
L Length of test course.
m Mass of the tire, wheel and hub.
n Wave number.
t Time.
T Duration (in time) of the test course.
V Velocity.
x Vertical displacement of the tire/terrain.
X(f,T) Fourier transform of x(t) over record length T.
y Vertical displacement of the wheel/hub.
Y(f,T) Fourier transform of y(t) over record length T.

Subscripts a Acceleration.
f Force.
i Independent variable.
j Independent variable.
x Vertical displacement of the tire/terrain interface.
y Vertical displacement of the wheel/hub interface.

The data acquired at each of the wheels is treated independently, thereby enabling determination of the profile of both the left and the right tracks of the road concurrently and also providing a means of assessing the quality of the data by determining the coherence of the front wheel profile with the rear wheel profile on the same side of the vehicle. The combination of the measured force and acceleration, along with the known mass, stiffness and damping characteristics of the tire, allows solution of a differential equation of motion for the variable x, the vertical elevation of the road surface.

$$c\frac{dx(t)}{dt} + kx(t) = m\frac{d^2y(t)}{dt^2} + c\frac{dy(t)}{dt} + ky(t) - F(t) \quad (1)$$

The second derivative of y with respect to time is measured directly by the accelerometer and F is measured directly by the force transducer.

To minimize the error in numerically integrating the time dependent variables, the Fourier transform of the above equation is taken over a long but finite time duration, T. This results in the following equation.

$$[k+j2\pi fc]X(f,T) = [k-(2\pi f)^2 m + j2\pi fc]Y(f,T) - F(f,T)$$

where $$X(f,T) = \int_0^T x(t) e^{-j2\pi ft} dt; \quad (2)$$

$$Y(f,T) = \int_0^T y(t) e^{-j2\pi ft} dt;$$

$$F(f,T) = \int_0^T f(t) e^{-j2\pi ft} dt$$

The duration T, in seconds, is fixed by the length of the test course L, in feet and is given by $$T = \frac{L}{V}$$

Identifying the frequency response functions, $$H_1(f) = \frac{1}{[k - (2\pi f)^2 m + j2\pi fc]};$$

$$H_2(f) = \frac{[k + j2\pi fc]}{[k - (2\pi f)^2 m + j2\pi fc]}$$

and noting that the Fourier transform of acceleration, A(f,T), is given by $$A(f,T) = -(2\pi f)^2 Y(f,T)$$

It follows that the frequency domain representation for x is:

$$X(f,T) = \frac{-1}{H_2(f)} \left[ \frac{A(f,T)}{(2\pi f)^2} + H_1(f)F(f,T) \right] \quad (3)$$

Using an appropriate commercially available Fourier transform computer code, the Fourier transforms of A(f,T) and F(f,T) are calculated from the acceleration and force signals. The two frequency response functions $H_1(f)$ and $H_2(f)$ are calculated from the known tire characteristics. Therefore, the above equation is solved for the parameter X(f,T).

The time history of the measured profile of the road (i.e. the elevation vs. distance profile of the road) is obtained by computing, using a commercially available code, the inverse Fourier transform of X(f,T) given by, $$x(t) = \int_0^{f_c} X(f,T) e^{j2\pi ft} df \quad (4)$$

where $f_c$ is the upper cut-off frequency of the computation (the Nyquist frequency) and is established by the sampling rate used to convert the analog signals to a digital format.

Power Spectral Density Function

The use of road roughness data in quantifying accelerated durability testing requires that any section of road be viewed in a statistical sense. It is common practice to describe the spectral characteristics of terrain and road roughness data in terms of the power spectral density function (PSD) which is a statistical representation of the road elevation as a function of frequency. To apply this function to road roughness data, it is assumed that the elevation profile for each test course can be viewed as a single physical realization of a random process. It is further assumed that each test course, excluding its mean elevation, is homogeneous (stationary in space) so that the ergodic theorem can be invoked to allow the spatial PSD of the terrain profile over a single test course to be interpreted as an estimate of the average terrain spatial PSD for all test courses of the same design. The homogeneity assumption is justified even for the test courses with systematic bumps (i.e., RMS Test Courses), if it is assumed that the distance between the start of the test course and the first bump for all possible test courses of the same design is a uniformly distributed random variable. These philosophical considerations, although rarely stated, are the theoretical justification for using spatial PSD's to describe road and terrain roughness data.

With the above assumptions in mind, the PSD of the vertical elevation profile versus time, x(t), for each test course is computed based upon the definition of the power spectral density function of the vertical elevation profile given by $$G_{xx}(f) = \lim_{T \to \infty} \frac{2}{T} E[X^*(f,T)X(f,T)] \quad (5)$$

where E[] denotes the expected value of [], and the asterisk (*) denotes complex conjugate. The cross-spectral density function between the response displacement, y(t) and the force, f(t), is given by $$G_{yf}(f) = \lim_{T \to \infty} \frac{2}{T} E[Y^*(f,T)F(f,T)] \quad (6)$$

The PSD of the terrain elevation is given by $$G_{xx}(f) = \frac{1}{|H_2(f)|^2} \{G_{yy}(f) + |H_1(f)|^2 G_{ff}(f) - 2Re[H_1(f)G_{yf}(f)]\} \quad (7)$$

In terms of the acceleration response of the axle, a(t), and its Fourier transform A(f,T) above, the PSD of the interface vertical elevation profile is given by $$G_{xx}(f) = \frac{1}{|H_2(f)|^2} \{[G_{aa}(f)/(2\pi f)^4] + |H_1(f)|^2 G_{ff}(f) + \quad (8)$$

$$2Re[H_1(f)G_{af}(f)/(2\pi f)^2]\}$$

The spectral terms in these equations cannot be computed precisely because it is not possible to fully execute the expected value and limiting operations. However, these quantities can be estimated to any desired level of precision by subdividing the available data record into $n_d$ contiguous segments, each of duration (length) T, and computing the power spectral density as follows:

$$G_{xx}(f) = \frac{2}{T} \sum_{i=0}^{n_d} X_i^*(f,T) X_i(f,T) \quad (9)$$

Commercial signal processing computer codes execute these procedures.

The description of the terrain elevation in terms of a PSD, as opposed to the simple Fourier spectrum, offers the following advantages:

1. The PSD is consistent with the usual descriptions of terrain roughness.
2. The cross-spectrum portion of the computation provides the best linear approximation, in the least squares sense, for nonlinear properties in the tire response.
3. The cross-spectrum portion of the computation suppresses the extraneous measurement noise in the instrumentation. However, extraneous noise will sum into the power spectra terms, so good signal-to-noise ratios in the measurements are important.

The PSD analysis procedure eliminates the ability to reconstruct the time histories represented by the PSD's. However, for applications as a roughness index, this is not important. The response of vehicle structures to terrain roughness induced dynamic loads is highly dependent on frequency. Hence, the primary information of interest to assess the damage potential of a terrain is the PSD of the terrain profile which is given by the wave-number spectrum, $G_{xx}(n)$, where $n=f/V$. It follows that the PSD provides a meaningful measure of terrain roughness, from a vehicle damage potential viewpoint.

Coherence Function

A full description of the terrain roughness requires not only the spectrum of the terrain elevation at each of the individual wheels of the test vehicle, but also a measure of the relationships among the terrain elevations at all four wheels. This spatial relationship can be described by the coherence function between the terrain elevations measured at the various wheels. The coherence function (in frequency-domain terms) is defined by $$\gamma_{ij}^2(f) = \frac{|G_{ij}(f)|^2}{G_{ii}(f)G_{jj}(f)} \quad (10)$$

where
$G_{ij}(f)$ = cross-spectrum between the terrain elevations at the ith and jth wheels
$G_{ii}(f)$ = PSD of the terrain elevation at the ith wheel
$G_{jj}(f)$ = PSD of the terrain elevation at the jth wheel The coherence function is a frequency (wave number) dependent real number bounded by zero and one, where $\gamma_{ij}^2(f)=0$ indicates there is no linear relationship between the two measurements, and $\gamma_{ij}^2(f)=1$ means there is a perfect linear relationship between the two measurements. For the front and rear wheels on either side of the vehicle, the coherence must be close to one at all frequencies, since the rear wheel traverses the exact path of the front wheel (assuming no turns) and, hence, sees the same elevation profile with only a translation in time (distance). On the other hand, for the left and right wheels on either the front or rear of the vehicle, the coherence at all frequencies (wave numbers) can vary from $\gamma_{ij}^2(f)=0$, as might occur on a cobble stone or "Belgian Block" surface which imparts rolling input to the vehicle, to $\gamma_{ij}^2(f)=1$, as would occur on a road with one-dimensional roughness which imparts only pitching input to the vehicle.

FIG. 3 is a flow chart of the digital embodiment of the frequency-domain analysis incorporated in the road profile computer 24. At the start 36 of the analysis program, the various constants required for the completion of the analysis are provided with appropriate initial values 38. The constants include the mass of the wheel/hub assembly, m, which is weighed and/or calculated; the stiffness of the tire, k, which is measured independently; the damping of the tire, c, which is measured independently; the desired incremental frequency, df, of the resulting computations; the cutoff frequency, fmax, employed in the analysis; and the initial zero value of the block number. Data is read at block 40 from the computer file to define the sample rate, r, at which the data was acquired; the size of each block of data, T, to be analyzed; and the number of blocks of data, N, contained in the run.

The computation begins with a computational loop 42 which assures that each block of data is analyzed in sequence. The function at 44 accomplishes this requirement. The time-dependent velocity is read from the data file at 46. It is desirable to obtain the data with the vehicle travelling at a constant velocity to reduce the errors in the analysis procedure. The average velocity over the duration of the block is computed at 48 and the incremental distance travelled between samples, ds, is computed at 50. This value can be used in the presentation of the final results to display vertical displacement of the roadway as a function of the distance along the roadway.

The time-dependent vertical acceleration is read from the file at 52. A fourier transformation of the acceleration 54 is performed using a commercially available fourier transform computer code which converts the information to the frequency domain from the time domain. Likewise, the vertical wheel force is read from the file at 56. A fourier transformation of the force 58 is performed using the same commercially available computer code resulting in a frequency domain representation of the force signal.

A computational loop in the frequency domain is performed at 60 to determine the vertical displacement of the roadway. The loop parameter, f, is initialized to zero at 62. Incrementing the frequency parameter, f, by the predetermined constant value, df, is accomplished at 64. Two parameters, $H_1(f)$ and $H_2(f)$ are calculated at 66 and 68. These values are then used at 70 to compute the vertical displacement at the new frequency. This continues until the cutoff frequency is reached.

An inverse fourier transformation is performed at 74 using commercially available computer codes to convert the frequency domain vertical displacement to a time domain vertical displacement. A test is performed at 76 to determine if all of the blocks in the run have been analyzed. If not, the loop 42 increments the block number and analyzes the next block of data. This continues until all blocks have been analyzed and the program ends 78. The analyzed information can be presented in terms of vertical displacement of the roadway as a function of either time increments or distance along the roadway. The latter being an accurate description of the physical situation.

For further analysis of the data in the frequency domain, the digital analysis code is interrupted at the dashed line marked A—A 80. The schematic flow diagram shown in FIG. 4 is inserted and the computation continues. The substitution of 82 is made to transform the information to the spatial domain in the form of wave number, cycles per unit length. This is consistent with the preferred analytical procedures in the analytical community. An initialization of the power spectral density function is performed at 84. The complete power spectral density function is computed at 86 using commercially available computer codes. The asterisk in this procedure represents the complex conjugate of the variable. The test at 88 determines if all the blocks of data in the run have been analyzed. If not, the computational loop 42 is executed and the next block of data is analyzed. This continues until all of the data has been analyzed and the sums of the power spectral densities have been accumulated at 86. The test at 88 is then satisfied and the power spectral density is divided by the number of blocks analyzed at 90. The result is the power spectral density of the whole run and the program ends at 92.

FIG. 5 is a schematic flow diagram of the digital embodiment in the road profile computer 24 that further analyzes the data acquired from each of the four wheels of the vehicle to determine the coherence of the resulting road profiles. If two wheels of the vehicle follow the same track, the coherence should be high. If they do not follow the same track, as a left wheel and a right wheel, the coherence may be low. This provides additional confidence in the quality of the results of the analysis. The program starts at 94 and, with the wheel locations identified by the numbers one through four, the first wheel number variable, i, is initialized to zero at 96. The computational loop 98 will assure that the variable i is incremented appropriately. The second wheel number variable, j, is incremented appropriately by the computational loop 100. The first wheel number variable is incremented at 102. The second wheel number variable is initialized appropriately at 104 and is incremented appropriately at 106. The cross spectral density of the ith signal with the jth signal is computed at 108 using the computational method of FIG. 4. Tests on the wheel number variables are conducted at 110 and 112 to assure that all combinations have been analyzed. If not, the computational loops 98 and 100 provide for incrementing the variables. If all of the combinations have been analyzed, the program continues to 114 where the wheel number variable initialization steps are repeated. The computational loops 116 and 118, the initializing step 122 and the incrementing steps 120 and 124 perform the same function as above. The coherence function 126 is computed using commercially available computer codes. The testing steps 128 and 130 assure that all combinations of the coherence function have been computed. The program ends at step 132.

To those skilled in the art to which this invention relates, many changes in construction and widely differing embodiments and applications of the invention will make themselves known without departing from the spirit and scope of the invention. The disclosure and the description herein are purely illustrative and are not intended to be in any sense limiting.

What is claimed is:

1. A method for measuring the vertical elevation profile of a road or terrain surface with respect to an inertial reference plane, comprising the steps of:
providing a measurement vehicle adapted to be propelled over the road surface and including an axle with at least one measuring wheel mounted thereon, said wheel having a hub;
measuring the force normal to the roadway applied by the vehicle axle to the hub of said measuring wheel;
measuring the acceleration of the hub of each measuring wheel in a direction normal to the roadway;
digitally measuring the rotation of said measuring wheel for the purpose of determining vehicle speed along the road surface and the distance traveled along the road surface;
processing the acceleration and force signals acquired to establish a vertical displacement x of the wheel/terrain interface to provide a road/terrain profile; and
storing the resulting measurements and processed road profile information.

2. The method set forth in claim 1 comprising the additional steps of processing the acquired signals from the measuring means in the frequency domain to minimize the computational errors in the determination of the road profile.

3. The method set forth in claims 1 or 2 comprising the additional step of processing the frequency domain road profile in statistically significant power spectral density format.

4. The method set forth in claim 1 further including the additional step of processing the resulting road profile in a statistically significant power spectral density format that provides indices allowing the comparison of one terrain to another.

5. The method set forth in claim 1 including the additional step of processing the resulting road profile in a statistically significant power spectral density format that provides measures of the energy imparted to the vehicle for the purposes of quantifying the extent of accelerated durability testing.

6. The method set forth in claim 1 wherein the vertical displacement x of the tire/terrain interface is defined by the equation:

$$[k+j2\pi fc]X(f,T)=[k-(2\pi f)^2m+j2\pi fc]Y(f,T)-F(f,T)$$

where
$X(f,T) =$ $$X(f,T) = \int_0^T x(t)e^{-j2\pi ft}dt;$$

$$Y(f,T) = \int_0^T y(t)e^{-j2\pi ft}dt;$$

$$F(f,T) = \int_0^T f(t)e^{-j2\pi ft}dt$$

K is a constant relative to tire stiffness
J is an independent variable
F is frequency
C is a tire damping constant
T is duration (in time) of the test course
X(f,T) is the Fourier transform of X(t) over record length T
M is the mass of the tire, wheel and hub
Y(f,T) is the Fourier transform of Y(t) over record length T
F(f,T) is the Fourier transform of F(t) over record length T.

7. The method set forth in claim 3 wherein the frequency domain representation for x is defined by:

$$X(f,T) = \frac{-1}{H_2(f)}\left[\frac{A(f,T)}{(2\pi f)^2} + H_1(f)F(f,T)\right]$$

$H_2(f)$ is a frequency response function

A(f,t) is a Fourier transform of a(t) over record length T $H_1(f)$ is a frequency response function.

8. The method as set forth in claim 1 including the steps of:
   providing a measurement vehicle with a forward measuring wheel and a rear measuring wheel on each side of the vehicle;
   measuring the force normal to the roadway applied by the vehicle axle to the hub of each said forward and said rear measuring wheel on each side of the vehicle;
   measuring the acceleration of the hub of each said forward and rear measuring wheel in a direction normal to the roadway on each side of the vehicle;
   processing the force and acceleration measurements of said forward and rear measuring wheels to determine a coherence function between the road elevation profiles of said front and rear wheels and left and right wheels.

9. The method of claim 8 wherein said coherence function is defined by the expression:

$$\gamma_{ij}^2(f) = \frac{|G_{ij}(f)|^2}{G_{ii}(f)G_{jj}(f)}$$

where
   $G_{ij}(f)$ = cross-spectrum between the terrain elevations at the ith and jth wheels
   $G_{ii}(f)$ = PSD of the terrain elevation at the ith wheel
   $G_{jj}(f)$ = PSD of the terrain elevation at the jth wheel.

10. The method set forth in claim 1 wherein the step of processing the signals comprises the sub-steps of:
    acquiring a plurality of blocks of data taken over a time period at constant vehicle velocity;
    storing time-dependent vertical acceleration signals for each block of data and converting them to the frequency domain representation of acceleration;
    storing time-dependent force signals for each block of data and converting them to the frequency of force;
    performing a computational loop in the frequency domain to determine the vertical displacement of the roadway for each data block;
    converting the frequency domain vertical displacement to a time domain vertical displacement for each data block; and
    presenting the processed data in terms of vertical displacement of the roadway as a function of either time increments or distance along the roadway.

11. Apparatus for measuring a terrain surface vertical elevation profile comprising:
    a measurement vehicle adapted to be propelled over paved or unpaved terrain to be measured and including an axle with a plurality of measuring wheels each having a hub;
    force measuring means mounted at the interface of the axle and the hub of each measuring wheel for providing a first signal as a function of the force imposed by the vehicle axle on the hub as the vehicle is propelled over the terrain;
    acceleration measuring means mounted at the interface of the axle and hub of each measuring wheel for providing a second signal as a function of acceleration of said hub in a direction normal to the terrain surface as the vehicle is propelled over the terrain surface;
    means responsive to the vehicle travel over the terrain surface for providing a third signal indicative of vehicle speed over the terrain surface; and
    means for processing an appropriate combination of said signals in the frequency domain to derive a representation of the profile of the terrain surface over which the vehicle is propelled.

12. The apparatus described in claim 11 wherein said means for processing comprises a road profile computer which processes said signals in the frequency domain.

13. The apparatus described in claim 12 including data storage means for recording processed data from said road profile computer.

14. The apparatus described in claim 11 wherein said vehicle has four measuring wheels with a force measuring means and an acceleration measuring means located adjacent the hub of each said wheel.

15. The apparatus as described in claim 11 wherein said means for processing comprises a computer utilizing signals from said force measuring means and said acceleration measuring means in accordance with the relationship:

$$X(f,T) = \frac{-1}{H_2(f)} \left[ \frac{A(f,T)}{(2\pi f)^2} + H_1(f)F(f,T) \right]$$

wherein:
   X(f,T) = Fourier Transform of the elevation versus distance profile of the terrain,
   $H_1(f)$ = Frequency response function
   $H_2(f)$ = Frequency response function
   A(f,T) = Fourier Transform of the output of the acceleration measuring means,
   F(f,T) = Fourier Transform of the output of the force measuring means,
   f = frequency over the frequency range of interest
   T = Period of time.

* * * * *

UNITED STATES PATENT AND TRADEMARK OFFICE
CERTIFICATE OF CORRECTION

PATENT NO. : 5,065,618
DATED : November 19, 1991
INVENTOR(S) : Henry C. Hodges, Sr., et al It is certified that error appears in the above-identified patent and that said Letters Patent is hereby corrected as shown below:

On the Title page at [75] "Hency C. Hodges, Sr. should be -- Henry C. Hodges, Sr. --.

Signed and Sealed this

Fifteenth Day of June, 1993

Attest:

MICHAEL K. KIRK

Attesting Officer

Acting Commissioner of Patents and Trademarks